(12) United States Patent
Chowdhury et al.

(10) Patent No.: US 7,167,466 B2
(45) Date of Patent: Jan. 23, 2007

(54) METHOD AND APPARATUS FOR DYNAMICALLY ASSIGNING A HOME AGENT

(75) Inventors: Kuntal Chowdhury, Plano, TX (US); Serge Manning, Richardson, TX (US); Pierre Boulos, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 867 days.

(21) Appl. No.: 09/989,599

(22) Filed: Nov. 20, 2001

(65) Prior Publication Data

US 2002/0114323 A1    Aug. 22, 2002

Related U.S. Application Data

(60) Provisional application No. 60/267,868, filed on Feb. 9, 2001, provisional application No. 60/273,864, filed on Mar. 7, 2001, provisional application No. 60/297,024, filed on Jun. 8, 2001.

(51) Int. Cl.
*H04L 29/06* (2006.01)
(52) U.S. Cl. .................................................. 370/349
(58) Field of Classification Search ................ 370/349
See application file for complete search history.

(56) References Cited

U.S. PATENT DOCUMENTS

| 6,636,491 B1 * | 10/2003 | Kari et al. ................ 370/328 |
| 6,771,623 B1 * | 8/2004 | Ton .......................... 370/331 |
| 6,785,823 B1 * | 8/2004 | Abrol et al. ................. 726/7 |
| 6,795,705 B1 * | 9/2004 | Warrier et al. ........... 455/435.1 |
| 2002/0080819 A1 * | 6/2002 | Tsao .......................... 370/469 |

FOREIGN PATENT DOCUMENTS

EP    1 058 421 A2    12/2000

OTHER PUBLICATIONS

Perkins, Charles E. "Mobile IP". May 1997. pp. 84-99.*
Perkins, C., IBM Corporation, T.J. Watson Research Center, Hawthorne, NY: Memo and Abstract titled "IP Mobility Support," see pp. 48 to 60 (Oct. 1996).
Jue, J. P. et al. *Design and Analysis of a Replicated Server Architecture for Supporting IP-Host Mobility*; Mobile Computing and Communications Review, vol. 2, No. 3; Jul. 1998; pp. 16-23 XP000768934.
PCT WO 01/06734 A2; 3COM CORPORATION; Xu, Yingchun, et al.; Jan. 25, 2001.
PCT WO 00/44148; 3COM CORPORATION; Dynarski, Richard, et al.; Jul. 27, 2000.
J. Solomon, Motorola, S. Glass: "Mobile-IPV4 Configuration Option for PPP IPCP", RFC2290; Feb. 1998, pp. 1-17.

* cited by examiner

*Primary Examiner*—Wellington Chin
*Assistant Examiner*—Derrick Ferris
(74) *Attorney, Agent, or Firm*—Carr LLP

(57) ABSTRACT

A method and apparatus for dynamically assigning a home agent to a mobile station for a mobile IP session. The method and apparatus allow the telecommunications network to assign the home agent that is best able to serve the mobile station. This is achieved by utilizing a predetermined IP address that indicates to the network components, such as the packet-switched data network, the home agent, the home authorization, authentication, and accounting server, and the like, that the mobile station is requesting a dynamically assigned home agent.

10 Claims, 11 Drawing Sheets

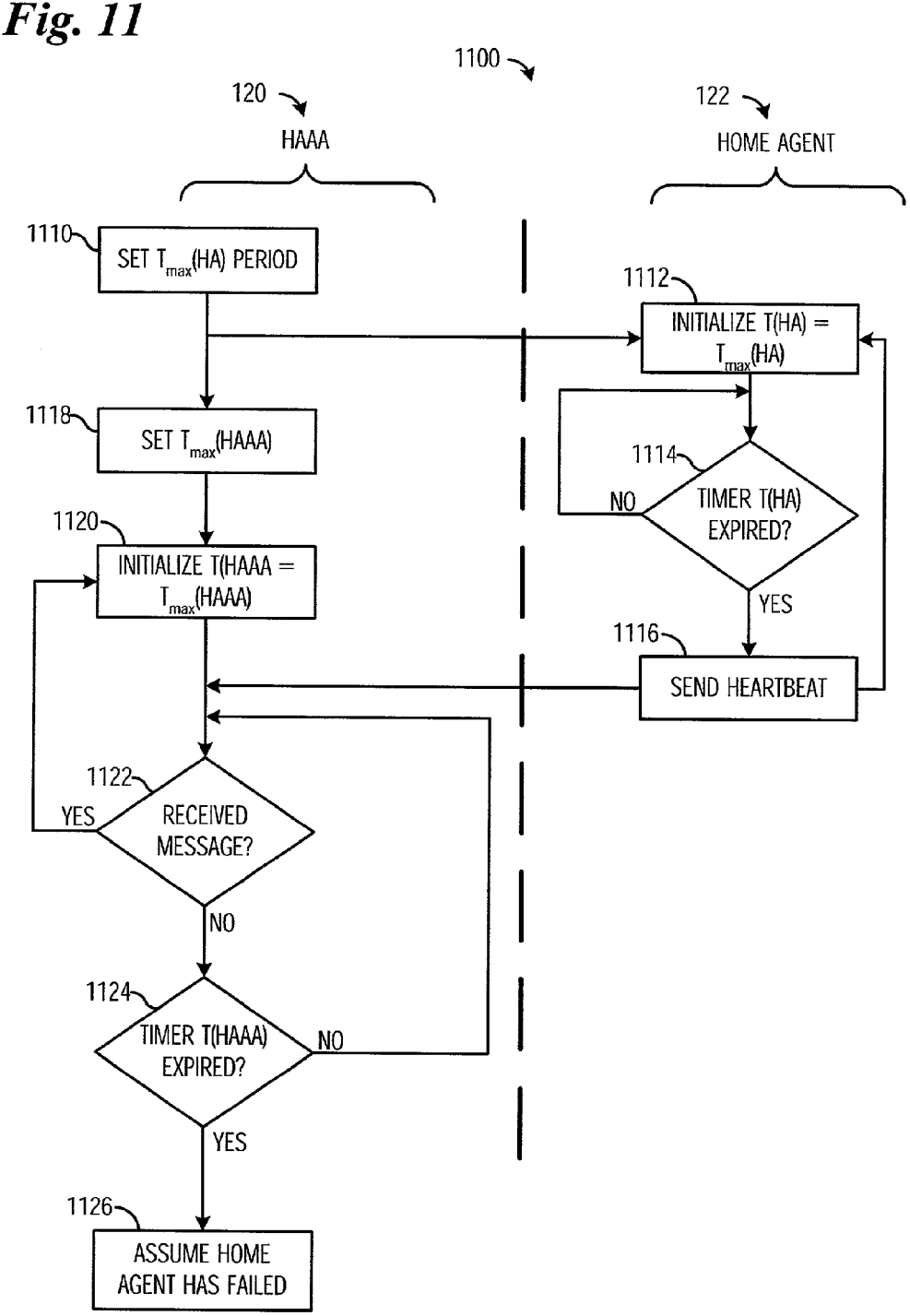

METHOD AND APPARATUS FOR DYNAMICALLY ASSIGNING A HOME AGENT

CLAIM OF PRIORITY

This application claims priority from U.S. Provisional Patent Application No. 60/267,868 entitled "METHOD TO DYNAMICALLY ASSIGN A HOME AGENT IN A RADIUS BASED SYSTEM" filed on behalf of Chowdhury, et al., on Feb. 9, 2001, U.S. Provisional Patent Application No. 60/273,864 entitled "METHOD TO DYNAMICALLY ASSIGN A HOME AGENT IN A RADIUS BASED SYSTEM" filed on behalf of Chowdhury, et al., on Mar. 7, 2001, and U.S. Provisional Patent Application No. 60/297,024 entitled "METHOD TO DYNAMICALLY ASSIGN A HOME AGENT IN A RADIUS BASED SYSTEM" filed on behalf of Chowdhury, et al., on Jun. 8, 2001.

TECHNICAL FIELD

The invention relates generally to communications systems and, more particularly, to a method and an apparatus for dynamically assigning a home agent to a mobile station for a mobile IP session.

BACKGROUND

Mobile stations are generally statically assigned a home agent for a mobile Internet Protocol (IP) session. Standards and protocols, such as the Telecommunications Industry Association-Electronic Industries Alliance-Interim Standard-835-A (TIA/EIA-IS-835-A), statically assign the home agent and prevent effective load balancing. As a result, one home agent may be extremely busy while another home agent within the same home network may be idle. This results in an inefficient use of the resources and, possibly, a degradation in the service provided to the mobile station (MS) users. Furthermore, if the statically assigned home agent fails, such as a hardware and/or software failure, the MS is likely to be without mobile IP services.

Thus, a need exists for a method and an apparatus that dynamically assign a home agent to mobile station for a mobile IP session.

SUMMARY

The present invention provides a method and an apparatus for dynamically assigning a home agent to a mobile station for a mobile IP session. Accordingly, the mobile station requiring mobile IP services requests a home agent, which is selected and assigned from a pool of available home agents to service the mobile station

BRIEF DESCRIPTION OF THE DRAWINGS

For a more complete understanding of the present invention, and the advantages thereof, reference is now made to the following descriptions taken in conjunction with the accompanying drawings, in which:

FIG. 11 is a flow chart illustrating the control logic for a home agent and a home authorization, authentication, and accounting server to determine if the home agent has failed.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning network communications and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

It is yet still further noted that though the present disclosure discusses the present invention in terms of an environment utilizing a Remote Authentication Dial-In User Service (RADIUS)-based authentication, authorization, and accounting (AAA) system, the present invention may be used in any type of architecture that supports statically-assigned IP addresses, such as Mobile IP networks, wireless and/or wireline networks, or the like. The implementation of the present invention in these other types of architectures will be obvious to one skilled in the art upon a reading of the present disclosure, and, therefore, the present invention should not be limited to a RADIUS-based AAA system.

The principles of the present invention and their advantages are best understood by referring to the illustrated embodiment depicted in FIGS. 1–11.

Figure 1:
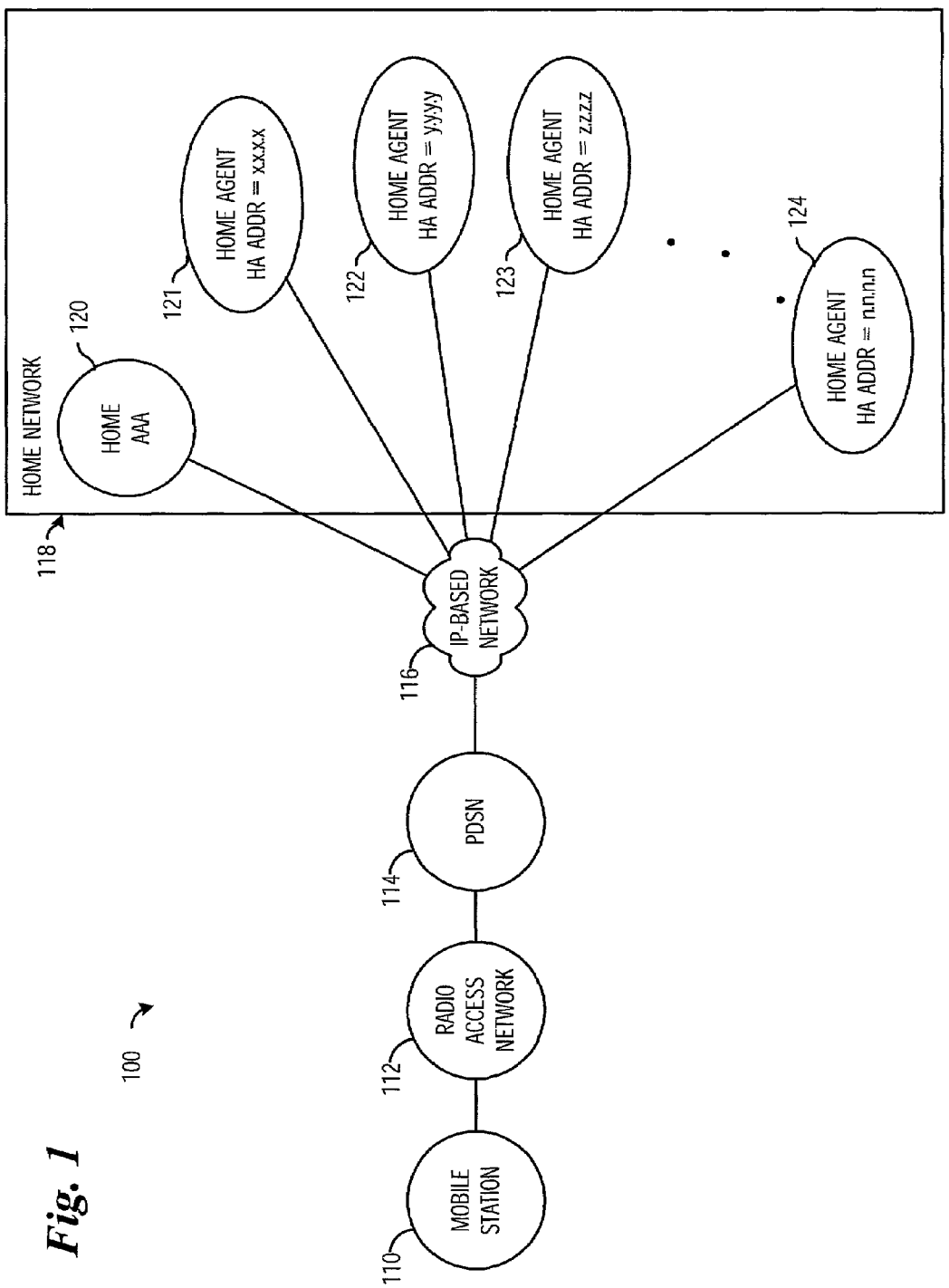
FIG. 1 schematically depicts a typical network environment that embodies features of the present invention.

Referring to FIG. 1 of the drawings, the reference numeral 100 generally depicts a communications system that embodies features of the present invention. Generally, a mobile station (MS) 110 is configured for wireless communications to a Radio Access Network (RAN) 112. The technology used for the wireless communications between the mobile station 110 and the RAN 112 may comprise of any technique, such as Time Division Multiple Access (TDMA), Code Division Multiple Access (CDMA), and Global System for Mobile Communications (GSM), and the like, that provides suitable bandwidth and quality for a particular application.

The RAN 112 is coupled to a Packet Data Serving Node(PDSN) in a wireless network and/or a foreign agent in a wireline network, collectively referred to as a PDSN 114, and is configured for providing the MS 110 access to the PDSN 114. The PDSN 114 is coupled to an Internet Protocol-based (IP-based) network 116, such as the Internet or the like, which provides connectivity to a home network 118. The home network 118 generally comprises a home authentication, authorization, and accounting server (HAAA) 120 and one or more home agents 121, 122, 123, and 124. The HAAA 120 may comprise of one or more HAAAs, but is shown, and will be referred to, as a single server. The application of the present invention in an environment that comprises of more than one HAAAs 120 will be obvious to one of ordinary skill in the art upon a reading of the present disclosure.

The HAAA 120 is preferably configured to provide AAA services and to manage the IP addresses for a pool of one or more home agents, such as home agents 121, 122, 123, and 124. The home agents 121, 122, 123, and 124 provide IP-based services, such as Mobile IP, IP Security (IPsec), and the like, to the mobile station 110. Each of the home agents 121, 122, 123, and 124 are preferably configured to have at least a home agent address (HA ADDR). Shown within each of the home agents 121, 122, 123, and 124 is the HA ADDR, which is the IP address of the respective home agent, i.e., messages directed to the HA ADDR will be directed to the respective home agent. Not shown is the HOME ADDR, which is the IP address within the home network 118 assigned to the MS 110, i.e., messages directed to the HOME ADDR will be directed to the respective MS 110 assigned to that HOME ADDR.

Figure 2:
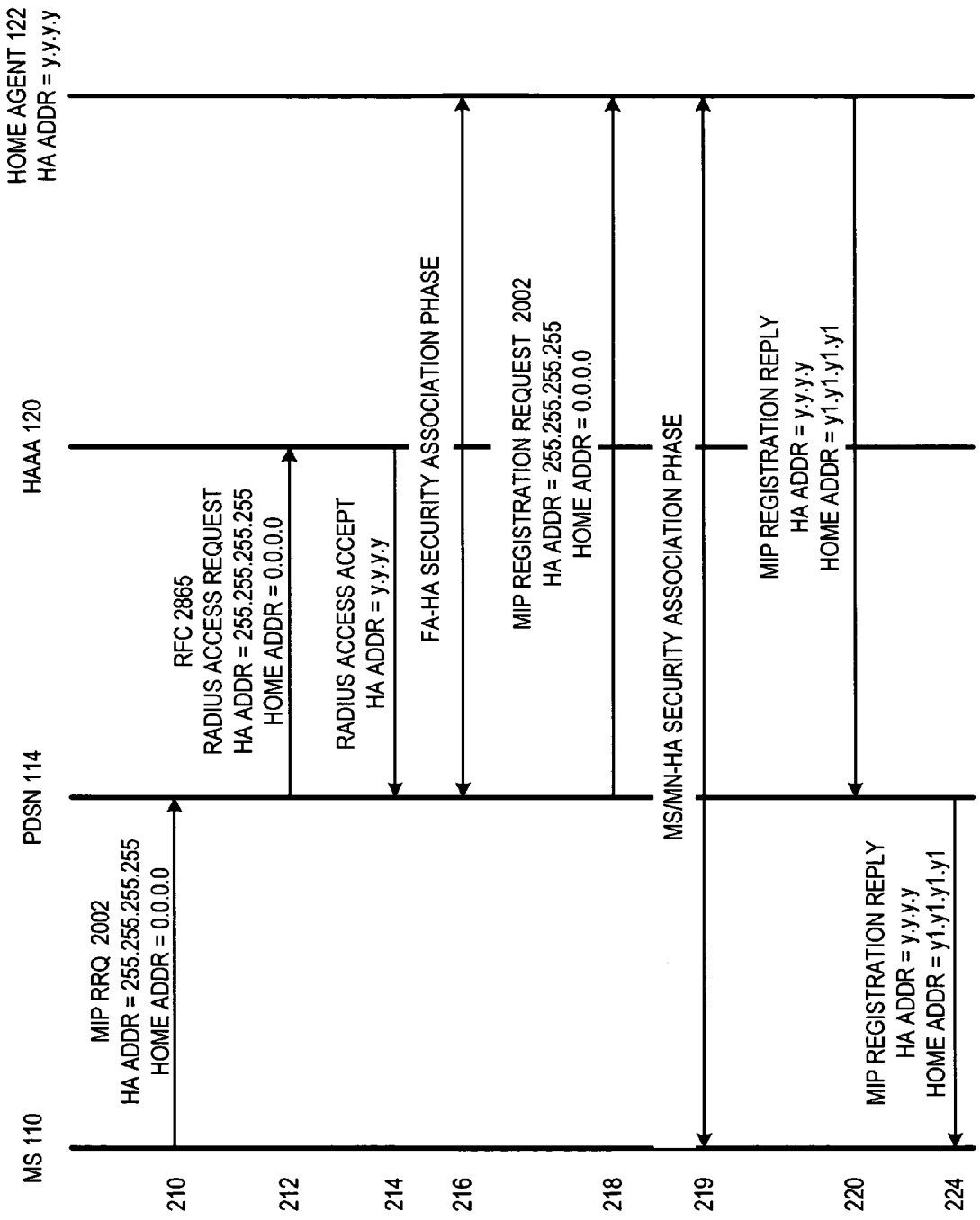
FIG. 2 is a message flow diagram illustrating one embodiment in which a mobile station requests dynamic assignment of a home agent.

FIG. 2 illustrates one message flow embodying features of the present invention during an IP-service request from a dynamically assigned home agent 121, 122, 123, and/or 124. Note that home agent 122 is shown in FIG. 2 for exemplary purposes only and should not be construed as limiting the scope of the present invention in any manner. Furthermore, the messages and message content are preferably defined by Mobile IP Request For Comments (RFC) 2002 and RADIUS RFC 2865, which are incorporated herein by reference for all purposes, and are used for exemplary purposes and should not be construed as limiting the scope of the present invention in any manner.

Furthermore, note that the RAN 112 and the IP-based network 116 are not shown. Preferably, the RAN 112 and the IP-based network 116 are transport mechanisms and do not play a decision role in the preferred embodiment. The operation and possible variations of the RAN 112 and the IP-based network 116 will be obvious to one of ordinary skill in the art upon a reading of the present invention, and therefore, will not be discussed in greater detail except insofar as is necessary to understand the present invention.

Upon requiring an IP connection, the MS 110 transmits a MOBILE IP REGISTRATION REQUEST (MIP RRQ) message 210. In the case of dynamic home agent assignment, the HA ADDR and the HOME ADDR fields contain a predetermined value that indicates the desire of the MS 110 to use a dynamically-assigned home agent. For the purposes of the present disclosure the predetermined value for the HA ADDR field is assumed to be "255.255.255.255" and the predetermined value for the HOME ADDR field is assumed to be "0.0.0.0." Other values, however, may be used. It should also be noted, however, that these values are IPv4 addresses, and that other types of addresses, such as IPv6 addresses, or the like, may also be used.

Upon receipt by the PDSN 114 of the MIP RRQ message 210, the PDSN 114 transmits a request message, such as a RADIUS ACCESS REQUEST message 212, to the HAAA 120. Preferably, the RADIUS ACCESS REQUEST message 212 includes an HA ADDR field and a HOME ADDR field set to the values contained in the respective fields of the MIP RRQ message 210. The PDSN 114 generally uses a broker AAA server (not shown) to determine the IP address of the HAAA 120. The use of a broker AAA server, or other means, is considered to be well known in the art and the operation of such with the present invention is considered to be obvious to a person of ordinary skill in the art upon a reading of the present disclosure, and, therefore, will not be discussed in further detail.

The HAAA 120 evaluates the HA ADDR and the HOME ADDR fields to determine whether the home agent is to be dynamically assigned, semi-statically assigned, or statically assigned, as will be discussed below with reference to FIG. 3. The message flow and address values illustrated in FIG. 2, however, exemplify the preferred scenario in which the home agent is dynamically assigned. The remaining scenarios are illustrated and discussed below with reference to FIGS. 5, 6, and 7.

The HAAA 120 dynamically assigns a home agent, such as the home agent 122, from a pool of home agents 121–124 within the home network 118. The HAAA 120 may use any suitable load-balancing algorithm, such as round robin, weighted least connections, sticky connections, weighted least load first, or the like, to balance the load among the home agents 121, 122, 123, and 124 of the home network 118. The suitable load-balancing algorithms are considered well known to a person of ordinary skill in the art and, therefore, will not be discussed in greater detail.

The HAAA 120 indicates the assigned home agent in an accept message, such as a RADIUS ACCESS ACCEPT message 214, by including an HA ADDR attribute. The HA ADDR attribute conforms to the TIA-EIA-IS-835-A, Annex C, dated April 2001, which is incorporated herein by reference for all purposes, comprising a vendor-value field set equal to the HA ADDR of the home agent selected by the HAAA 120 to manage the IP session of the MS 110. In the illustrated example, the value of the HA ADDR attribute is the IP address of the home agent 122, i.e., "y.y.y.y".

Additionally, the values of the HA ADDR and the HOME ADDR fields of the MIP RRQ message 210 are forwarded to the home agent 122 as part of the MIP RRQ message 218 for use in the FOREIGN AGENT (FA)—HOME AGENT (HA) SECURITY ASSOCIATION PHASE 216, which is preferably performed as specified in TIA/EIA-IS-835-A. The process and method of performing the FA-HA SECURITY ASSOCIATION PHASE 216 is well known to a person of ordinary skill in the art and, therefore, will not be discussed in greater detail except insofar as is necessary to describe the present invention.

Upon successful completion of the FA-HA SECURITY ASSOCIATION PHASE 216, the PDSN 114 transmits a MIP RRQ message 218 to the IP address specified in the HA ADDR attribute, i.e., the home agent 122, setting the values of the HA ADDR and the HOME ADDR fields to the values of the corresponding fields in the MIP RRQ message 210, i.e., "255.255.255.255" and "0.0.0.0", respectively. The home agent 122 interprets the value of 0.0.0.0 in the HOME ADDR field as a request for dynamic HOME ADDR allocation and allocates an IP address for use by the MS 110. When the Home Agent receives a registration request message with a HA ADDR field value set to 255.255.255.255 instead of it's own address, the Home Agent preferably accepts the registration request.

In response to the MIP RRQ message 218, the MS 110 and the home agent 122 perform the MOBILE STATION/ NODE (MS/MN)—HOME AGENT (HA) SECURITY ASSOCIATION PHASE 219, which is generally required for a valid MIP session registration. The process and method of performing the MS/MN-HA SECURITY ASSOCIATION 219 are well known to a person of ordinary skill in the art and, therefore, will not be discussed in greater detail except insofar as is necessary to describe the present invention. Preferably, a shared secret value is used between the MS 110 and the home agent 122 for MS/MN-HA SECURITY ASSOCIATION 219. The shared secret value allows an MS to be validated for services by any home agent in the home network. The use and distribution of the shared secret among the home agents is considered well known to a person of ordinary skill in the art upon a reading of the present invention, and, therefore, will not be discussed in greater detail.

Upon successful completion of the MS/MN-HA SECURITY ASSOCIATION PHASE 219, the home agent 122 transmits to the PDSN 114 an MIP REGISTRATION REPLY message 220 with the HA ADDR field set to the IP address of the home agent 122, i.e., "y.y.y.y", and the HOME ADDR field set to the IP address assigned to the MS 110, i.e., "y1.y1.y1.y1". Upon receipt, the PDSN forwards to the MS 110 the information in an MIP REGISTRATION REPLY message 222. Thereafter, the MS 110 is assigned the HA ADDR of "y.y.y.y" and the HOME ADDR of "y1.y1.y1.y1", and is able to access IP-based services until the MIP registration lifetime expires. If the MS 110 must perform re-registration (not shown), such as that required at Mobile IP registration lifetime expiry during a active data session, the MS 110 utilizes the HA ADDR of "y.y.y.y" and the HOME ADDR of "y1.y1.y1.y1". The process of re-registration will be obvious to one skilled in the art upon a reading of the present disclosure and, therefore, will not be discussed in greater detail. If the MIP registration lifetime expires and the MS 110 does not re-register, then the IP address allocated to the MS 110, i.e., "y1.y1.y1.y1" will be de-allocated by the home agent 122. In the subsequent MIP registration the MS 110 sends "0.0.0.0" in the HOME ADDR and "255.255.255.255" in the HA ADDR fields to start a new Mobile IP session. The MS 110 may receive a different HOME ADDR and may be registered with a different home agent, such as home agents 121, 123, or 124.

Figure 3:
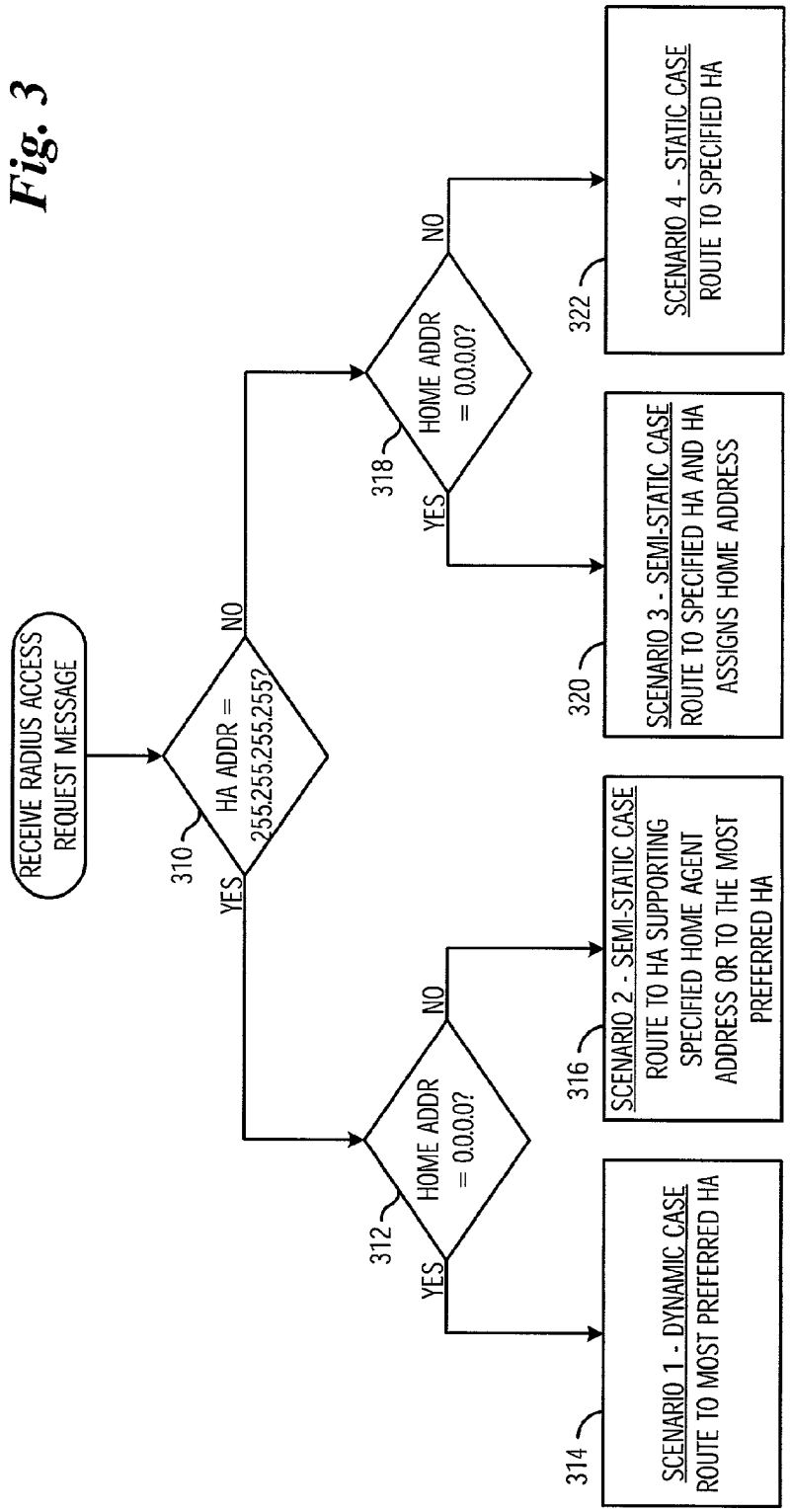
FIG. 3 is a flow chart illustrating the control logic for a home authentication, authorization, and accounting server to determine if a home agent may be dynamically assigned.

FIG. 3 depicts a flowchart of steps that are preferably performed by the HAAA 120 upon receipt of the RADIUS ACCESS REQUEST message 212 (FIG. 2). Processing begins in step 310 upon the receipt of the RADIUS ACCESS REQUEST message, wherein a determination is made whether the home agent address, i.e., HA ADDR, is set to a predetermined value, such as "255.255.255.255", that indicates the desire to dynamically assign a home agent. If, in step 310, a determination is made that the home agent address is equal to "255.255.255.255", then processing proceeds to step 312, wherein a determination is made whether the home address is equal to a predetermined value, such as "0.0.0.0", that indicates that the home address may be dynamically assigned.

If, in step 312, it is determined that the value of the HOME ADDR field is equal to "0.0.0.0", then processing proceeds to step 314, wherein the Scenario 1 processing is performed. Preferably, the HAAA 120 and/or the home agents 121, 122, 123, and 124 are allowed to dynamically assign the home agent and the IP address assigned to the MS 110. In Scenario 1, the HAAA is allowed to dynamically assign the home agent and responds with a RADIUS ACCESS ACCEPT message 214 with the HA ADDR attribute containing the IP address of the assigned home agent, as discussed above with reference to FIG. 2.

If, in step 312, a determination is made that the value of the HOME ADDR field is not equal to "0.0.0.0", then processing proceeds to step 316, wherein the Scenario 2 processing is performed. In Scenario 2, the MS 110 specifies the HOME ADDR, i.e., the desired IP address, and forces the HAAA 120 to assign the home agent containing the HOME ADDR. Since this semi-static scenario is essentially a static assignment, this scenario is not preferred. In this scenario, the HAAA responds with a RADIUS ACCESS ACCEPT message 214 that includes a HA ADDR attribute containing the IP address of the home agent to which the HOME ADDR belongs.

If, in step 310, a determination is made that the value of the HA ADDR field is not equal to "255.255.255.255", i.e., the home agent may not be dynamically assigned, then processing proceeds to step 318, wherein a determination is made whether the HOME ADDR is equal to a predetermined value, such as "0.0.0.0". If, in step 318, a determination is made that the value of the HOME ADDR field is equal to "0.0.0.0", then processing proceeds to step 320, wherein the Scenario 3 processing is performed. In Scenario 3, the value of the HA ADDR was specified by the MS 110, preventing the dynamic assignment of the home agent. The home address, however, was not specified and allows the specified home agent to dynamically assign the home address, i.e., the IP address of the MS 110. In this scenario, the HAAA 120 preferably responds with a HA ADDR attribute containing the IP address of the home agent specified by the MS 110. Note that since the home agent address is the same, the HA ADDR attribute could be left off, but is preferred for the sake of consistency.

If, in step 318, a determination is made that the value of the HOME ADDR field is not equal to "0.0.0.0", then processing proceeds to step 322, wherein the Scenario 4 processing is performed. Scenario 4 is a static case in which the MS 110 specifies both the home agent address and the home address. In this scenario, the HAAA 120 preferably responds with a HA ADDR attribute containing the IP address of the home agent specified by the MS 110. Note that since the home agent address is the same, the HA ADDR attribute could be left off, but is preferred for the sake of consistency.

Figure 4:
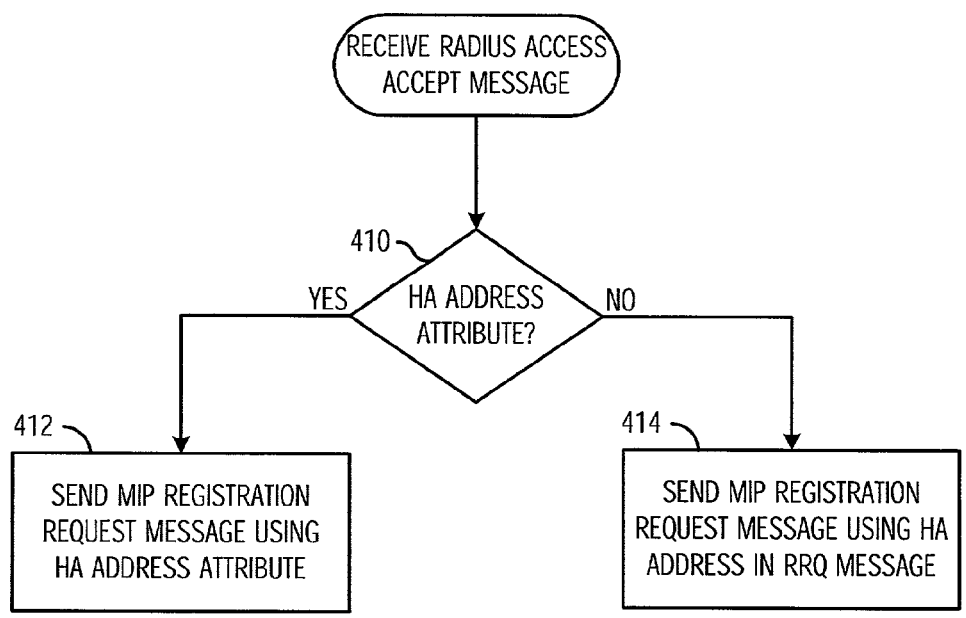
FIG. 4 is a flow chart illustrating the control logic for a packet-switched data network to determine if a home agent is being dynamically assigned.

FIG. 4 depicts a flowchart of steps that are preferably performed by the PDSN 114 upon receipt of the RADIUS ACCESS ACCEPT message 214 (FIG. 2) and after completing the FA-HA SECURITY ASSOCIATION PHASE 216 (FIG. 2). Processing begins in step 410, wherein a determination is made whether the RADIUS ACCESS ACCEPT message 214 includes a HA ADDR attribute. If, in step 410, a determination is made that the RADIUS ACCESS ACCEPT message 214 contains a HA ADDR attribute then processing proceeds to step 412, wherein the PDSN 114 transmits a MIP RRQ message 218 (FIG. 2) to the IP address specified by the HA ADDR attribute. The values for the HA ADDR and the HOME ADDR fields are preferably the values contained in the corresponding fields of the MIP RRQ message 210.

If, however, in step 410 a determination is made that the RADIUS ACCESS ACCEPT message 214 does not contain a HA ADDR attribute then processing proceeds to step 414, wherein the PDSN 114 transmits an MIP RRQ message 218 (FIG. 2) to the IP address specified by the HA ADDR field of the MIP RRQ message 210. Optionally, the PDSN 114 may perform a validity check by validating that the IP address is a valid IP address. If the IP address is not a valid IP address, then the PDSN 114 preferably transmits a reject message to the MS 110.

Figure 5:
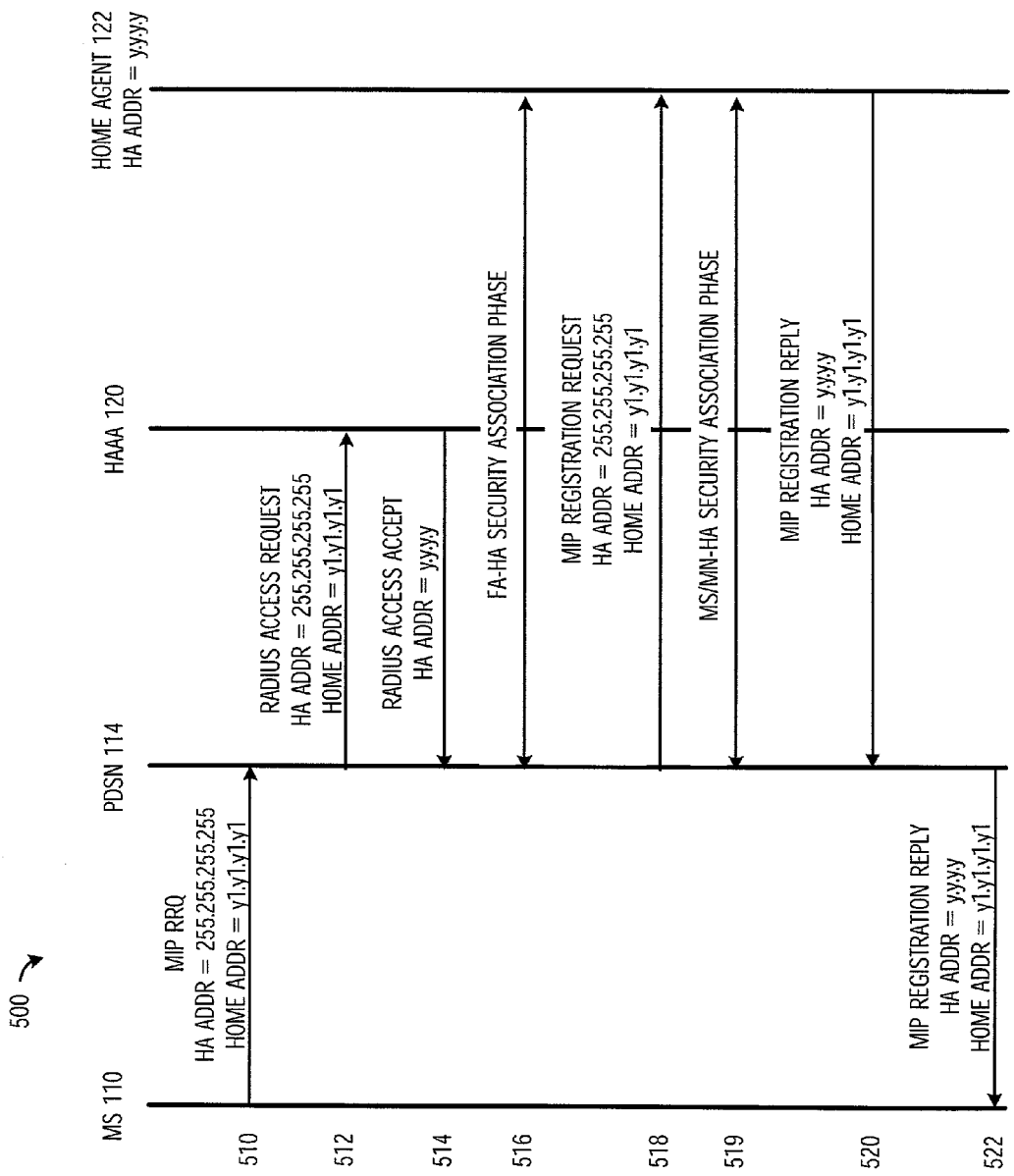
FIG. 5 is a message flow diagram illustrating one embodiment in which a mobile station specifies a home agent address.
Figure 6:
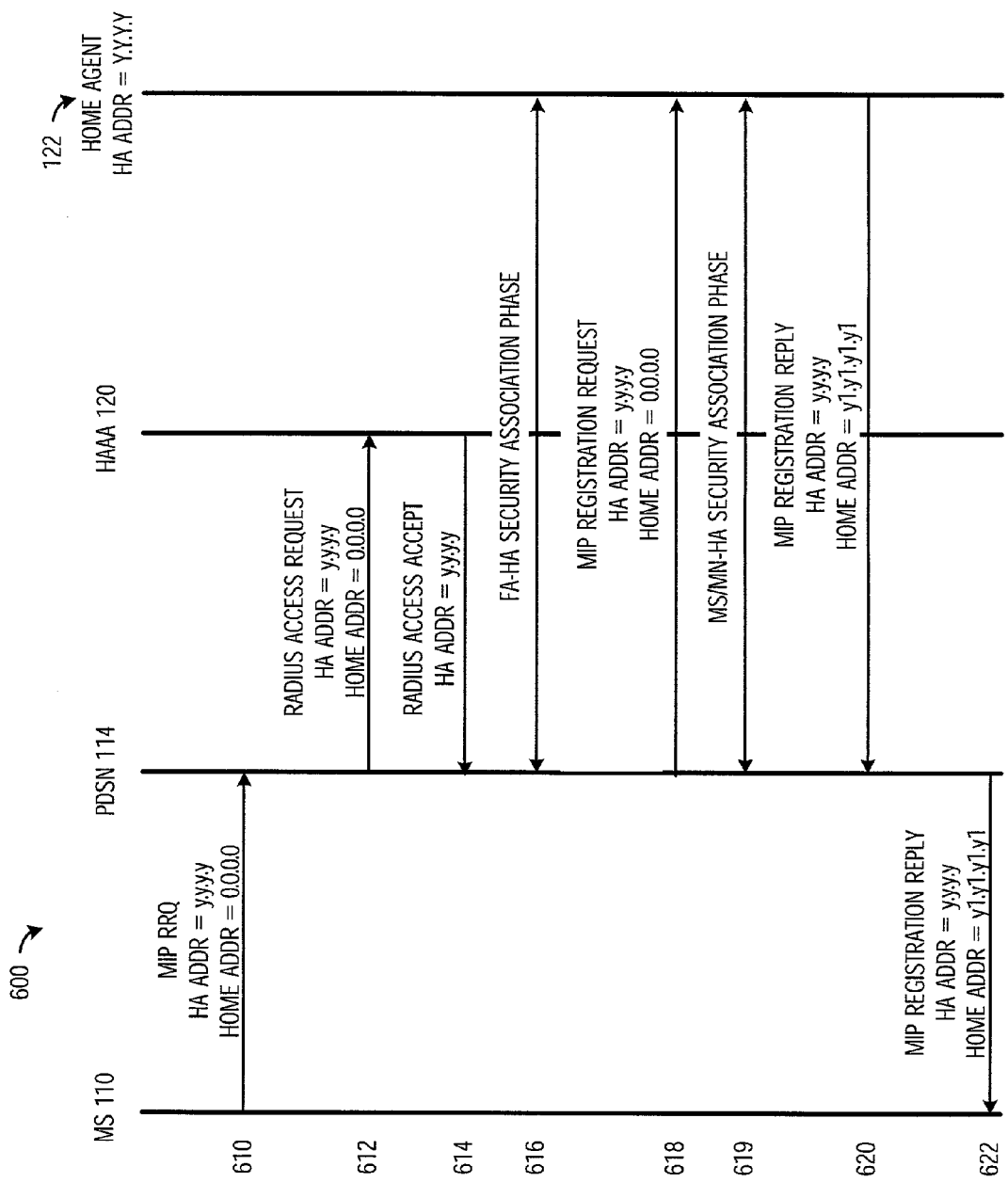
FIG. 6 is a message flow diagram illustrating one embodiment in which a mobile station specifies a home address.
Figure 7:
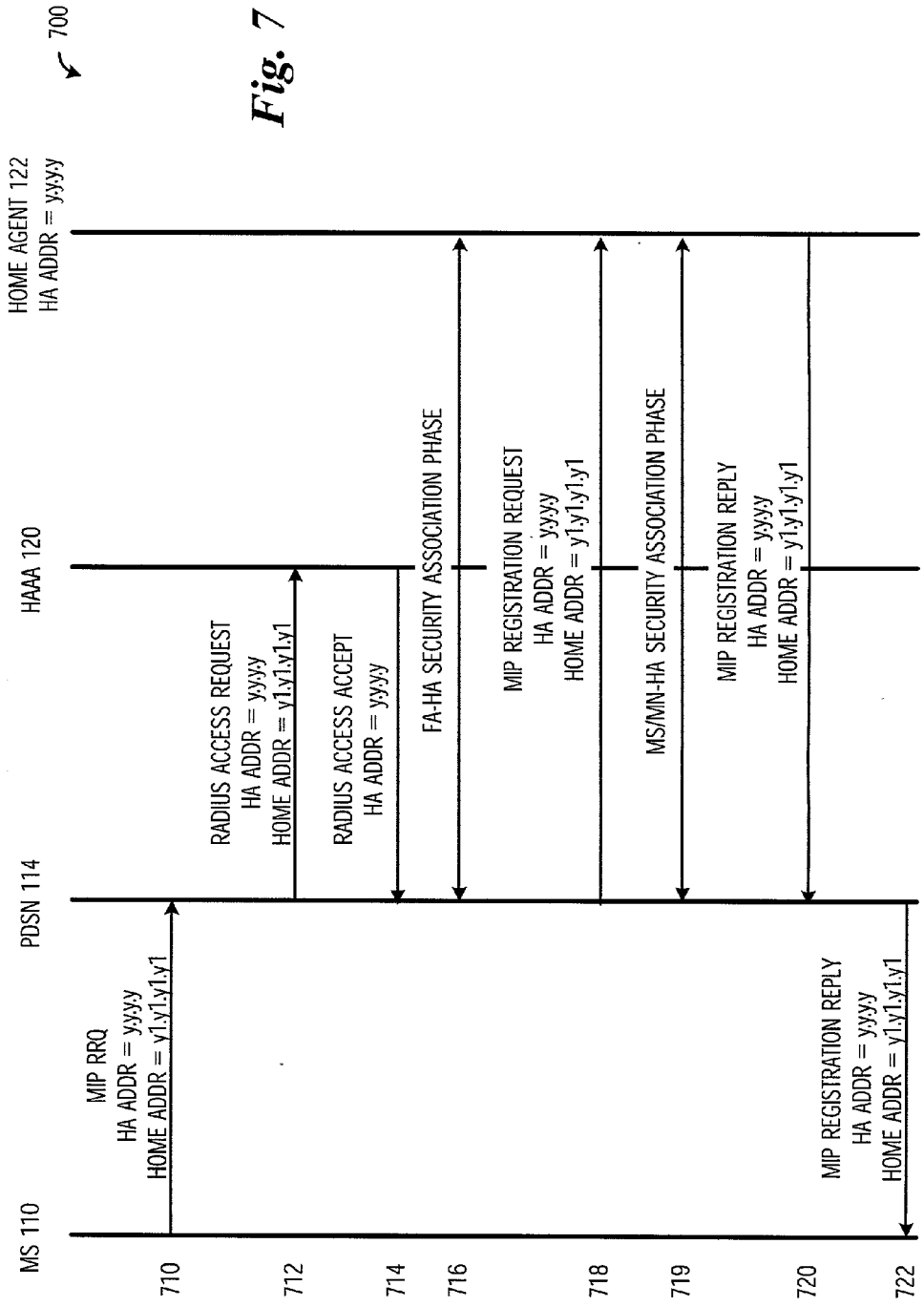
FIG. 7 is a message flow diagram illustrating one embodiment in which a mobile station specifies a home address and a home agent address.

FIGS. 5, 6, and 7 illustrate message flows 500, 600, and 700, respectively, embodying features of the present invention during an IP-service request from a home agent 121, 122, 123, and/or 124. Specifically, message flow 500 illustrates the semi-static home agent assignment discussed above with reference to Scenario 2, step 316 (FIG. 3); message flow 600 illustrates the semi-static home agent assignment discussed above with reference to Scenario 3, step 320 (FIG. 3); and message flow 700 illustrates the static home agent assignment discussed above with reference to Scenario 4, step 322 (FIG. 3).

FIG. 5 is similar to FIG. 2 with the exception that the MS 110 specifies the value of the HOME ADDR field, i.e., "y1.y1.y1.y1", in the MIP RRQ message 510. As a result, the PSDN 114 transmits to the HAAA 120 a RADIUS ACCESS REQUEST message 512 with a HOME ADDR field containing "y1.y1.y1.y1". The HAAA 120 assigns the home agent containing the requested HOME ADDR value, as discussed above with reference to step 316 (FIG. 3). The HAAA 120 transmits to the PDSN 114 a RADIUS ACCESS ACCEPT message 514 containing the home agent IP address, i.e., "y.y.y.y", in the HA ADDR attribute field, and the HA ADDR and the HOME ADDR fields set to the values of the corresponding fields of the RADIUS ACCESS REQUEST message 512, i.e., "255.255.255.255" and "y1.y1.y1.y1", respectively.

After performing the FA-HA SECURITY ASSOCIATION PHASE 516, the PDSN transmits an MIP RRQ message 518 to the home agent specified by the IP address contained in the HA ADDR attribute of the RADIUS ACCESS ACCEPT message 514, the MIP RRQ message 518 having the HA ADDR and the HOME ADDR fields set to the values of the corresponding fields in the MIP RRQ message 510, i.e., "255.255.255.255" and "y1.y1.y1.y1", respectively. The remaining messages and processing are similar to the respective messages of FIG. 2.

FIG. 6 is also similar to FIG. 2 with the exception that the MS 110 specifies the value of the HA ADDR field, i.e., "y.y.y.y", in the MIP RRQ message 610. As a result, the PSDN 114 transmits to the HAAA 120 a RADIUS ACCESS REQUEST message 612 with a HA ADDR field containing "y.y.y.y". The HAAA 120 assigns the MS 110 to the home agent corresponding to the HA ADDR field, as discussed above with reference to step 320 (FIG. 3). The HAAA 120 transmits to the PDSN 114 a RADIUS ACCESS ACCEPT message 614 containing the home agent IP address, i.e., "y.y.y.y", in the HA ADDR attribute.

After performing the FA-HA SECURITY ASSOCIATION PHASE 616, the PDSN transmits an MIP RRQ message 618 to the home agent specified by the IP address contained in the HA ADDR attribute of the RADIUS ACCESS ACCEPT message 614, the MIP RRQ message 618 having the HA ADDR and the HOME ADDR fields set to the values of the corresponding fields in the MIP RRQ message 610, i.e., "y.y.y.y" and 0.0.0.0, respectively. The remaining messages and processing are similar to the respective messages of FIG. 2.

FIG. 7 is similar to FIG. 2 with the exception that the MS 110 specifies the HA ADDR and the HOME ADDR values, i.e., "y.y.y.y" and "y1.y1.y1.y1", respectively, in the MIP RRQ message 710. As a result, the PSDN 114 transmits to the HAAA 120 a RADIUS ACCESS REQUEST message 712 with a HA ADDR field containing "y.y.y.y" and a HOME ADDR field containing a HOME ADDR field containing "y1.y1.y1.y1". The HAAA 120 assigns the home agent corresponding to the value of the HA ADDR field, as discussed above with reference to step 316 (FIG. 3). The HAAA 120 transmits to the PDSN 114 a RADIUS ACCESS ACCEPT message 714 containing the home agent IP address, i.e., "y.y.y.y", in the HA ADDR attribute.

After performing the FA-HA SECURITY ASSOCIATION PHASE 716, the PDSN transmits an MIP RRQ message 718 to the home agent specified by the IP address contained in the HA ADDR attribute of the RADIUS ACCESS ACCEPT message 714, the MIP RRQ message 718 having the HA ADDR and the HOME ADDR fields set to the values of the corresponding fields in the MIP RRQ message 710, i.e., "y.y.y.y" and "y1.y1.y1.y1", respectively. The remaining messages and processing are similar to the respective messages of FIG. 2.

In all of the above static and semi-static scenarios, if the HAAA determines that a requested home agent is not available, then the HAAA 120 preferably allocates a different home agent for the session. The process of selecting a different home agent for the session is well known in the art, and, therefore, will not be discussed in greater detail.

Figure 8:
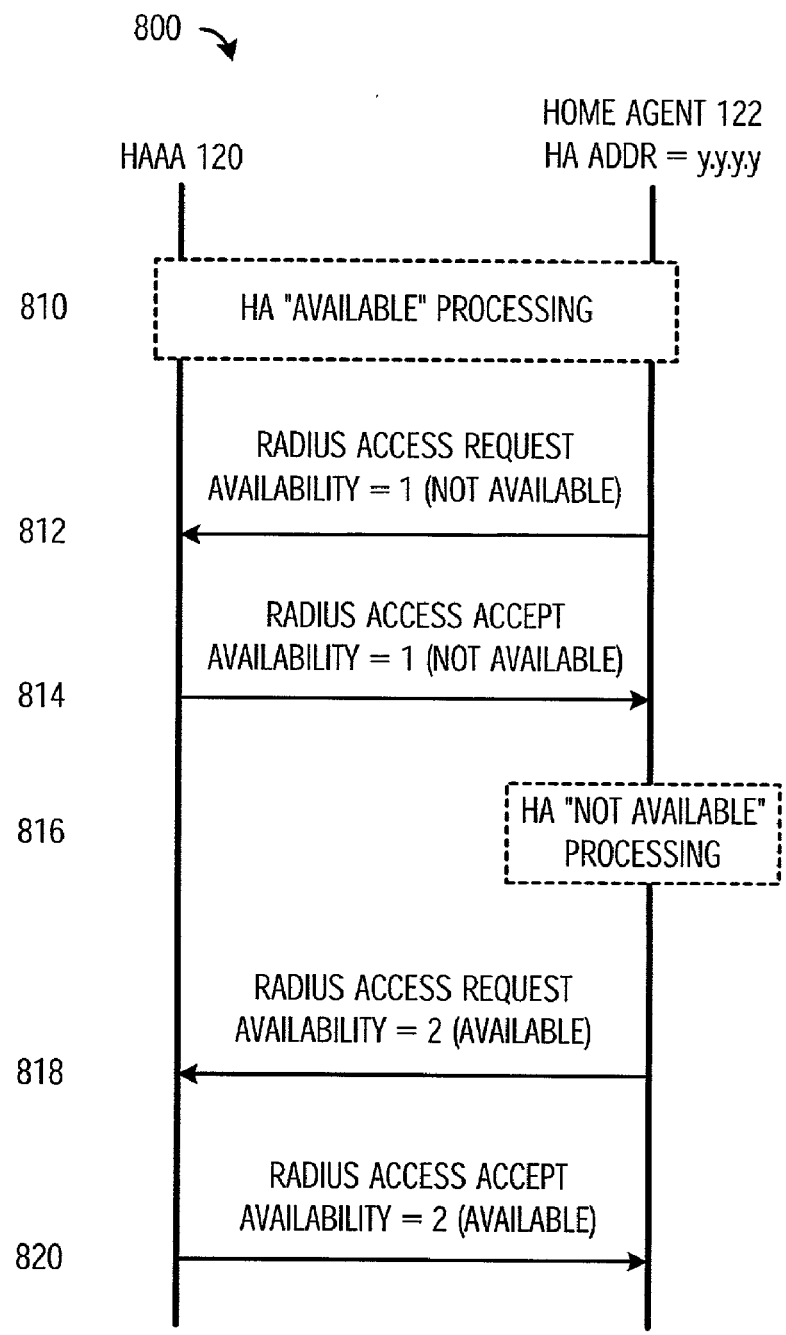
FIG. 8 is a message flow diagram illustrating one embodiment in which a home agent requests a status change.

FIG. 8 illustrates one message flow embodying features of the present invention when the home agent 122 requests a change of status from available to not available, and vice versa. Specifically, message flow 800 illustrates the preferred message flow for the home agent 122 to notify the HAAA 120 that the home agent 122 is busy, i.e., "Not Available," when the home agent 122 is unable to service additional MSs, and to notify the HAAA 120 that the home agent 122 is not busy, i.e., "Available," when the home agent 122 is able to service additional MSs.

Initially, the HAAA 120 and the home agent 122 perform the "HA 'Available' Processing" procedures 810, for which the "HA 'Available' Processing" procedure 810 performed by the home agent 122 is discussed below with reference to FIG. 9. Briefly, the HAAA 120 and the home agent 122 perform the processing described above to assign a home agent 122. The home agent 122 monitors the activities being performed by the home agent 122 and, upon a determination that the home agent is unable to service additional MSs, transmits to the HAAA 120 a RADIUS ACCESS REQUEST message 812 having an AVAILABILITY attribute. The AVAILABILITY attribute is added to indicate the availability of an HA to the RADIUS server, and preferably comprises a vendor-value of "1" to indicate that the home agent 122 is not available to service additional MSs and a vendor-value of "2" to indicate the home agent 122 is available to serve additional MSs. One embodiment of the method that the home agent 122 preferably performs to determine if the home agent 122 is not available is discussed below with reference to FIG. 8.

The HAAA 120 receives the RADIUS ACCESS REQUEST message 812 and indicates that the sending home agent, i.e., the home agent 122, is unavailable to service additional MSs. Preferably, the HAAA 120 maintains a table comprising a home agent identifier, such as the IP address of the home agent 122, and a status value, such as a 1 (not available) or a 2 (available). Any suitable means, such as maintaining an "available" list and a "not available" list, and the like, may be utilized to maintain the status of each home agent 121, 122, 123, and 124 within a home network 118. Other suitable means will be obvious to one skilled in the art upon a reading of the present disclosure and, therefore, are considered within the scope of the present invention.

The HAAA 120 transmits a RADIUS ACCESS ACCEPT message 814 to the home agent 122, acknowledging the acceptance of the status change by the HAAA 120. Thereafter, the home agent 122 performs the "HA 'Not Available' Processing" procedures 816, which are discussed in further detail below with reference to FIG. 10. Briefly, the home agent 122 monitors the IP sessions of the MSs and determines if the home agent 122 is able to service additional MSs.

Upon a determination that the home agent 122 is able to service additional MSs, the home agent 122 transmits to the HAAA 120 a RADIUS ACCESS REQUEST message 818 having an AVAILABILITY attribute equal to a predetermined value, such as a "2," that indicates that the home agent 122 is available to service additional MSs. The HAAA 120 indicates, preferably in the AVAILABILITY table as discussed above, that the home agent 122 is available to service additional MSs. Thereafter, the HAAA transmits a RADIUS ACCESS ACCEPT message 820 to the home agent 122, acknowledging the acceptance of the status change of the home agent 122.

Figure 9:
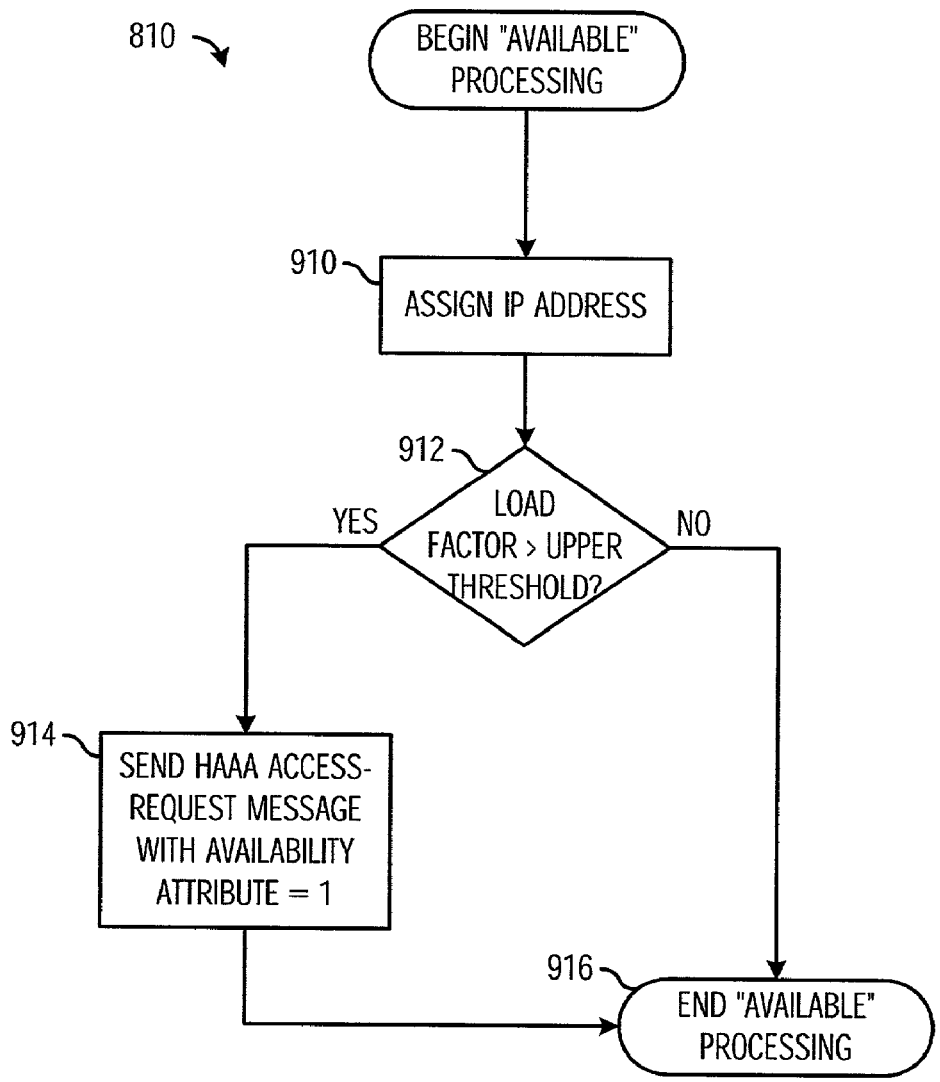
FIG. 9 is a flow chart illustrating the control logic for a home agent to determine if the home agent is available to service additional mobile stations.

FIG. 9 depicts a flowchart 810 of steps that are preferably performed by the home agent 122 during the "HA 'Available' Processing" procedures 810 (FIG. 8). The processing begins, in step 910, with the assignment of an IP address, such as that performed upon a receipt of an MIP RRQ message 218 (FIG. 2). After assigning the IP address, processing proceeds to step 912, wherein a determination is made whether the load factor is greater than an upper threshold. Preferably, a load factor is calculated that reflects the ability of the home agent 122 to handle additional calls, and may be based upon CPU usage, number of active sessions, disk accesses, memory accesses, memory usage, and/or the like. The threshold is preferably a configurable parameter that may be adjusted to maximize the efficient use of the resources while maintaining sufficient reserves to handle peak traffic.

If, in step 912, a determination is made that the load factor is greater than the upper threshold, then processing proceeds to step 914, wherein the home agent 122 transmits the RADIUS ACCESS REQUEST message 812 (FIG. 8), which preferably includes the AVAILABILITY attribute set to a predetermined value indicating that the home agent 122 is not available to service additional MSs. Thereafter, the processing proceeds to step 916, wherein the "HA 'Available' Processing" procedures 810 terminate.

If, in step 912, a determination is made that the load factor is not greater than the upper threshold, then processing proceeds to step 916, wherein the "HA 'Available' Processing" procedures 810 terminate.

Figure 10:
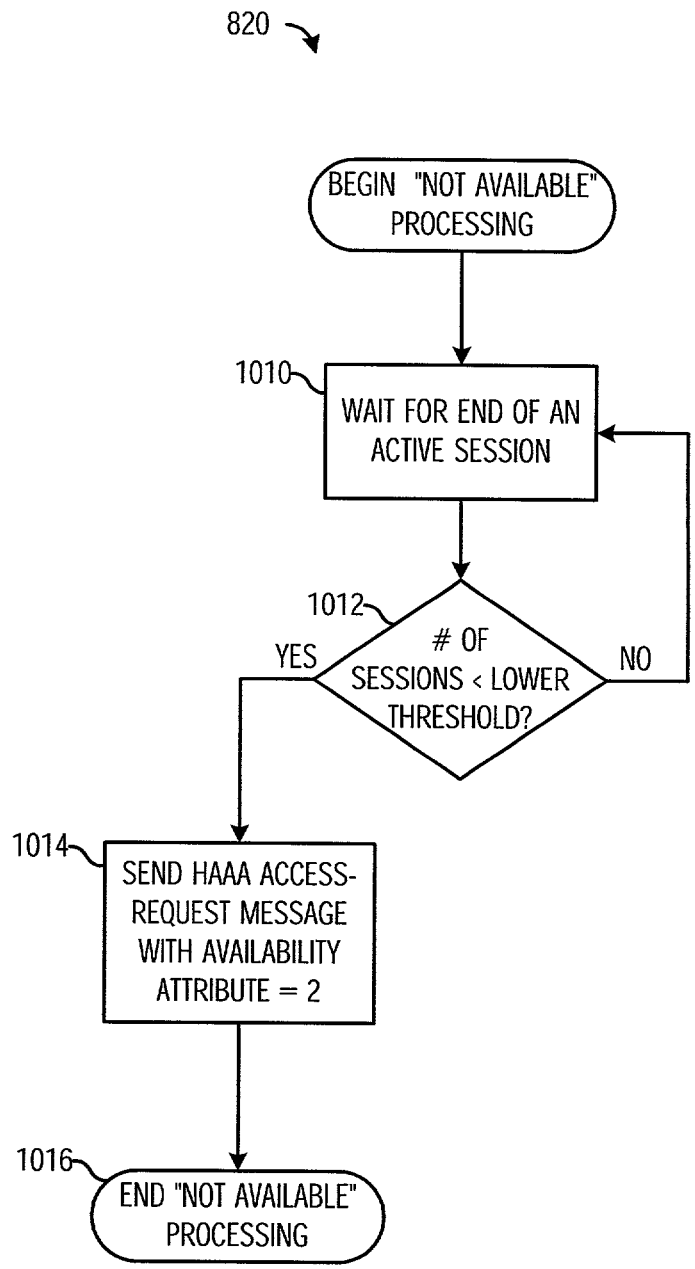
FIG. 10 is a flow chart illustrating the control logic for a home agent to determine if the home agent is not available to service additional mobile stations.

FIG. 10 depicts a flowchart 820 of steps that are preferably performed by the home agent 122 during the "HA 'Not Available' Processing" procedures 820 (FIG. 8). Processing begins, in step 1010, by waiting for an active IP session to terminate. Upon the termination of an active IP session, processing proceeds to step 1012, wherein a determination is made whether the load factor is less than a lower threshold. Preferably, the lower threshold is set lower than the upper threshold. By setting the upper and lower threshold in this manner, the status of the home agent 122 is set "not available" when the load factor exceeds the upper threshold and is set "available" when the number of active session is lower than the lower threshold, thereby preventing rapid changes in the status of the home agent 122.

If, in step 1012, a determination is made that the load factor is lower than the lower threshold, then processing proceeds to step 1014, wherein the home agent 122 transmits the RADIUS ACCESS REQUEST message 822 (FIG. 8), which preferably includes the AVAILABILITY attribute set to a predetermined value indicating that the home agent 122 is available to service additional MSs. Thereafter, processing proceeds to step 1016, wherein the "HA 'Not Available' Processing" procedures 820 terminate.

If, in step 1012, a determination is made that the load factor is not less than the lower threshold, then processing proceeds to step 1010, wherein the status is not modified and the processing waits for the end of an active session.

FIG. 11 depicts a flowchart 1100 of steps that are preferably performed by the HAAA 120 and the home agent 122 during operating states to detect the possible failure of the home agent 122. Generally, since the home agent 122 may be dynamically assigned by the HAAA 120, it is preferred that the HAAA 120 have a method for determining whether the home agent 122 has experienced a failure and/or is no longer available to service additional MSs. As will be discussed more fully below, the preferred method is to use a heartbeat message sent periodically from the home agent 122 to the HAAA 120. If the HAAA 120 does not receive a heartbeat message within a predetermined amount of time, then the HAAA 120 assumes that the home agent 122 has failed and is no longer able to service MSs. Note that for the sake of conciseness and readability, the flowchart 1100 illustrates communication directly between the HAAA 120 and the home agent 122, without showing the interaction of the PDSN 114. It will be obvious to one skilled in the art upon a reading of the present disclosure that the communication between the HAAA 120 and the home agent 122 may be direct communications and/or via another network component, such as the PDSN 114.

Initially, in step 1110, the HAAA 120 sets the maximum timer period for the home agent 122, referred to as $T_{max}$(HA). Alternatively, the home agent 122 may set the maximum timer period by the use of a look-up value, initialization table, and the like. It is preferred, however, that the HAAA 120 set the timer period for reasons of maintainability and configurability by including a TIMER attribute in a message, such as a RADIUS ACCESS ACCEPT message. The TIMER attribute preferably conforms to the TR45, CDMA2000 Wireless IP Network Standard TIA/EIA-IS-835-A, Annex C, dated April 2001, which is incorporated herein by reference for all purposes, comprising a vendor-value field set equal to the time period, preferably in seconds, between heartbeat messages. Preferably, the time period ranges from 1 second to FFFFFFFE(hex) seconds, and the time period of FFFFFFFF(hex) represents infinity, i.e., no heartbeat messages. Thereafter, processing proceeds to step 1112 in the home agent 122 and step 1118 in the HAAA 120.

In step 1112, the home agent 122 initializes the timer for the home agent, referred to as the T(HA), to the $T_{max}$(HA). Processing then proceeds to step 1114, wherein a determination is made whether the T(HA) has expired, i.e., whether the time period specified by the T(HA) has elapsed. If a determination is made that the T(HA) has not expired, then processing proceeds to step 1114, wherein the T(HA) is repeatedly evaluated until the T(HA) expires.

If, in step 1114, a determination is made that the T(HA) has expired, then processing proceeds to step 1116, wherein a heartbeat message is transmitted to the HAAA 120. Transmitting a heartbeat message is well known to a person of ordinary skill in the art and, therefore, will not be discussed in greater detail, except insofar as is necessary to discuss the present invention. After the heartbeat message is sent in step 1116, processing proceeds to step 1112, wherein the T(HA) steps 1112, 1114, and 1116 are repeated.

Optionally, the T(HA) and T(HAAA) may be reinitialized to $T_{max}$(HA) and $T_{max}$(HAAA), respectively, when the home agent 122 transmits a message to the HAAA 120.

In step 1118, the HAAA 120 sets the maximum timer period for the HAAA 120, referred to as $T_{max}$(HAAA). Generally, it is preferred to set the $T_{max}$(HA) less than $T_{max}$(HAAA) to allow for delays in sending of the heartbeat message. After the $T_{max}$(HAAA) is set, processing proceeds to step 1120, wherein the timer for the HAAA 120, referred to as the T(HAAA), is initialized to $T_{max}$(HAAA). Processing then proceeds to step 1122, wherein a determination is made whether the heartbeat message, referred to above with reference to step 1116, has been received. If a determination is made that the heartbeat message has not been received, then processing proceeds to step 1124, wherein a determination is made whether the T(HAAA) has expired. If a determination is made that the T(HAAA) has expired, then processing proceeds to step 1126, wherein the home agent 122 is assumed to have failed and, therefore, will not be assigned additional MSs to service.

If, in step 1124, a determination is made that the T(HAAA) has not expired, then processing returns to step 1122, wherein, as discussed above, a determination is made whether the heartbeat message has been received.

If, in step 1122, a determination is made that the heartbeat message has been received, then processing proceeds to step 1120, wherein steps 1120, 1122, and 1124 are repeated.

It is understood that the present invention can take many forms and embodiments. Accordingly, several variations may be made in the foregoing without departing from the spirit or the scope of the invention. For example, a static HA table for assigning HAs, i.e., no availability messaging, broadcast messaging for determining HA availability, and the like, may be used.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method of dynamically assigning a home agent, the method comprising the steps of:
    receiving an indication of the availability of one or more home agents;
    receiving an access request message indicating a request for mobile IP services, the access request message having a first home agent address and a first home address;
    determining whether the first home agent address and the first home address indicate a request for dynamic home agent assignment;
    upon a determination that the first home agent address and the first home address indicate a request for dynamic home agent assignment, performing the substeps of:
        assigning the home agent from a pool of available home agents; and
        transmitting a second home agent address of the home agent; request for a particular home agent;
    upon a determination that the first home agent address and the first home address indicate a request for a particular home agent, transmitting the home agent address of the particular home agent;
    determining whether the first home agent address and the first home address indicate a request for a particular home agent address;
    upon a determination that the first home agent address and the first home address indicate a request for a particular home address, transmitting the home agent address of the home agent containing the particular home address;
    determining whether the first home agent address and the first home address indicate a request for a static home agent; and
    upon a determination that the first home agent address and the first home address indicate a request for a static home address, transmitting the home agent address of the static home address.

2. The method of claim 1, further comprising the step of transmitting by the home agent a periodic heartbeat message.

3. The method of claim 1, wherein the access request message is a RADIUS ACCESS REQUEST message.

4. The method of claim 1, wherein the step of transmitting further comprises transmitting the home agent address in a RADIUS ACCESS ACCEPT message.

5. The method of claim 1, wherein the step of assigning the home agent further comprises the step of selecting a preferred home agent, wherein the preferred home agent is determined by at least one of round robin scheduling, weighted least connections scheduling, sticky connections scheduling, and weighted least load first scheduling.

6. The method of claim 1, wherein the step of assigning the home agent from a pool of available home agents is performed by the steps of:
    receiving a status message from one or more of the pool of one or more home agents;
    determining whether the status message includes an AVAILABLE indication or a NOT AVAILABLE indication;
    upon a determination that the status message includes an AVAILABLE indication, indicating that the home agent is available; and
    upon a determination that the status message includes a NOT AVAILABLE indication, indicating that the home agent is not available.

7. An apparatus for dynamically assigning a home agent, the apparatus comprising:
    means for receiving an indication of the availability of one or more home agents;
    means for receiving an access request message indicating a request for mobile IP services, the access request message having a first home agent address and a first home address;
    means for determining whether the first home agent address and the first home address indicate a request for dynamic home agent assignment;

means, upon a determination that the first home agent address and the first home address indicate a request for dynamic home agent assignment, for assigning the home agent from a pool of available home agents, and transmitting a second home agent address of the home agent;

means for determining whether the first home agent address and the first home address indicate a request for a particular home agent;

means, upon a determination that the first home agent address and the first home address indicate a request for a particular home agent, for transmitting the home agent address of the particular home agent;

means for determining whether the first home agent address and the first home address indicate a request for a particular home agent address;

means, upon a determination that the first home agent address and the first home address indicate a request for a particular home address, for transmitting the home agent address of the home agent containing the particular home address;

means for determining whether the first home agent address and the first home address indicate a request for a static home agent; and means, upon a determination that the first home agent address and the first home address indicate a request for a static home address, for transmitting the home agent address of the static home address.

8. The apparatus of claim 7, further comprising means for transmitting by the home agent a periodic heartbeat message.

9. The method of claim 7, wherein the step of assigning the home agent from a pool further comprises the step of selecting a preferred home agent, wherein the preferred home agent is determined by at least one of round robin scheduling, weighted least connections scheduling, sticky connections scheduling, and weighted least load first scheduling.

10. The apparatus of claim 7, wherein the means for assigning the home agent from a pool of available home agents further comprises:

means for receiving a status message from one or more of the pool of one or more home agents;

means for determining whether the status message includes an AVAILABLE indication or a NOT AVAILABLE indication;

means, upon a determination that the status message includes an AVAILABLE indication, for indicating that the home agent is available; and means, upon a determination that the status message includes a NOT AVAILABLE indication, for indicating that the home agent is not available.

* * * * *